(12) United States Patent
Park et al.

(10) Patent No.: US 11,581,555 B2
(45) Date of Patent: Feb. 14, 2023

(54) SYSTEM AND METHOD FOR FUEL SUPPLY CONTROL FOR A FUEL CELL

(71) Applicants: HYUNDAI MOTOR COMPANY, Seoul (KR); KIA CORPORATION, Seoul (KR)

(72) Inventors: Jun Young Park, Suwon-si (KR); Hak Yoon Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 79 days.

(21) Appl. No.: 17/380,706

(22) Filed: Jul. 20, 2021

(65) Prior Publication Data
US 2022/0166039 A1    May 26, 2022

(30) Foreign Application Priority Data
Nov. 24, 2020   (KR) ................. 10-2020-0158813

(51) Int. Cl.
*H01M 8/04119*   (2016.01)
*H01M 8/04992*   (2016.01)
*H01M 8/04082*   (2016.01)
*H01M 8/04791*   (2016.01)

(52) U.S. Cl.
CPC ... *H01M 8/04179* (2013.01); *H01M 8/04201* (2013.01); *H01M 8/04798* (2013.01); *H01M 8/04992* (2013.01)

(58) Field of Classification Search
None
See application file for complete search history.

(56) References Cited

U.S. PATENT DOCUMENTS

2013/0137007 A1*   5/2013   Lee ................. H01M 8/04447
                                                          429/444
2019/0067715 A1*   2/2019   Kwon ............... H01M 8/04373

FOREIGN PATENT DOCUMENTS

KR      101459815 B1     11/2014
KR      102452469 B1 *    3/2019   ....... H01M 8/04097

* cited by examiner

*Primary Examiner* — Haroon S. Sheikh
(74) *Attorney, Agent, or Firm* — Lempia Summerfield Katz LLC

(57) ABSTRACT

A fuel supply control system and method for a fuel cell are disclosed. The system includes: a fuel cell configured to receive a fuel gas and an oxidation gas and generate electric power; a recirculation line configured to circulate gas containing the fuel gas and connected to a fuel electrode of the fuel cell; a discharge valve provided in the recirculation line and configured to allow the gas to be discharged to the outside when open; a discharge amount estimator configured to estimate a discharge amount of the discharged gas based on a supply amount of the fuel gas supplied to the recirculation line, a consumption amount of the fuel gas consumed in the fuel cell, and a change in the amount of the gas in the recirculation line; an offset calculator configured to calculate the discharge amount of the gas estimated by the discharge amount estimator with the discharge valve closed, as a discharge offset; and a controller configured to control opening/closing of the discharge valve.

15 Claims, 2 Drawing Sheets

SYSTEM AND METHOD FOR FUEL SUPPLY CONTROL FOR A FUEL CELL

CROSS REFERENCE TO RELATED APPLICATION

The present application claims priority to Korean Patent Application No. 10-2020-0158813, filed Nov. 24, 2020, the entire contents of which are incorporated herein for all purposes by this reference.

BACKGROUND

1. Field of the Disclosure

The present disclosure relates to a system and a method for fuel supply control for a fuel cell and, more specifically, to a technology for accurately estimating the discharge amount of hydrogen discharged from a recirculation line such that an appropriate concentration of hydrogen is maintained.

2. Description of the Prior Art

A fuel cell is a kind of power generation device configured to directly convert chemical energy resulting from oxidation of fuel into electric energy. The fuel cell is similar to a chemical cell in that an oxidation-reduction reaction is utilized, but is different from a chemical cell, in which a cell reaction proceeds within a closed system, in that reaction materials are continuously supplied from the outside, and reaction resultants are continuously removed out of the system. Fuel cell power generation systems have recently been put to practical use, and there has been extensive research to use the same as eco-friendly vehicle energy sources because the reaction resultants in fuel cells are pure water.

A fuel cell system includes: a fuel cell stack for generating electric energy through a chemical reaction; an air supply device for supplying air to the air electrode of the fuel cell stack; and a fuel supply device for supplying fuel to the hydrogen electrode of the fuel cell stack. Air including oxygen is supplied to the air electrode (cathode) of the fuel cell stack and hydrogen is supplied to the hydrogen electrode (anode) of the fuel cell stack.

Hydrogen is supplied to the hydrogen electrode of the fuel cell stack through a recirculation line and high-concentration hydrogen is supplied from a hydrogen tank to the recirculation line such that hydrogen including impurities is discharged through purging, thereby maintaining the hydrogen concentration.

According to conventional technologies, the amount of gas discharged from the recirculation line is estimated to control the opening of the purge valve or to control the hydrogen concentration. This approach has a drawback in that it is difficult to maintain an appropriate concentration of hydrogen in the recirculation line, which is supplied to the fuel cell, because of a failure to reflect the fact that gases are discharged out of the recirculation line (crossover phenomenon) while the purge valve remains blocked.

The above description regarding background art is only to help understand the background of the present disclosure and is to be considered by a person having ordinary skill in the art as corresponding to already-known prior arts.

SUMMARY

The present disclosure has been proposed to solve the above-mentioned problems. It is an aspect of the present disclosure to provide a technology for accurately estimating the amount of gas purged and opening a discharge valve such that an appropriate hydrogen concentration is controlled and maintained in a recirculation line.

A fuel supply control system for a fuel cell according to the present disclosure may include: a fuel cell configured to receive a fuel gas and an oxidation gas and generate electric power; a recirculation line configured to circulate gas containing the fuel gas in the interior thereof and connected to a fuel electrode of the fuel cell; a discharge valve provided in the recirculation line and configured to allow the gas in the interior of the recirculation line to be discharged to the outside when being opened; a discharge amount estimator configured to estimate a discharge amount of the gas discharged from the recirculation line, based on a supply amount of the fuel gas supplied to the recirculation line, a consumption amount of the fuel gas consumed in the fuel cell, and a change in the amount of the gas in the interior of the recirculation line; an offset calculator configured to calculate the discharge amount of the gas, which is estimated by the discharge amount estimator in a state in which the discharge valve is closed, as a discharge offset; and a controller configured to control opening/closing of the discharge valve, based on the discharge amount of the gas, which is estimated by the discharge amount estimator, and the discharge offset calculated by the offset calculator.

The fuel supply control system may further include: a fuel tank, in which the fuel gas is stored in the interior thereof; and a supply amount estimator configured to estimate the supply amount of the fuel gas, based on a pressure of a connection hole connected from the fuel tank to the recirculation line and a pressure of the recirculation line.

The fuel supply control system may further include a consumption amount estimator configured to estimate the consumption amount of the fuel gas based on generated electric power or an output current of the fuel cell.

The fuel supply control system may further include a change amount estimator configured to estimate the change in the amount of the gas in the interior of the recirculation line, based on a change in the pressure of the recirculation line.

The offset calculator may calculate, as the discharge offset, the discharge amount of the gas discharged from the recirculation line to the outside per unit time in the state in which the discharge valve is closed.

The discharge amount estimator may calculate a purge amount per unit time of the gas discharged through the discharge valve by estimating the discharge amount of the gas per unit time in a state in which the discharge valve is opened and by subtracting the discharge offset calculated by the offset calculator from the estimated discharge amount of the gas per unit time.

The discharge amount estimator may calculate the gas purge amount by integrating the calculated purge amount per unit time by a period of time, for which the discharge valve is opened. The controller may control closing of the discharge valve, based on the calculated gas purge amount.

The fuel supply control system may further include a concentration estimator configured to estimate the concentration of the fuel gas of the recirculation line, based on the supply amount of the fuel gas, the consumption amount of the fuel gas, and the discharge amount of the gas in the interior of the recirculation line. The controller may control opening/closing of the discharge valve, based on the concentration of the fuel gas, which is estimated by the concentration estimator.

A fuel supply control method for a fuel cell according to the present disclosure may include: estimating a supply amount of the fuel gas supplied to a recirculation line, a consumption amount of the fuel gas consumed in a fuel cell, and a discharge amount of the gas discharged from the recirculation line, based on a change in the amount of the gas in the interior of the recirculation line; calculating the discharge amount of the gas estimated in a state in which a discharge valve is closed, as a discharge offset; and controlling opening/closing of the discharge valve, based on the estimated discharge amount of the gas and the calculated discharge offset.

The fuel supply control method may further include, before the estimating of the discharge amount of the gas, estimating the supply amount of the fuel gas, based on a pressure of an inlet connected from the fuel tank to the recirculation line and a pressure of the recirculation line.

The fuel supply control method may further include, before the estimating of the discharge amount of the gas, estimating the consumption amount of the fuel gas, based on generated electric power or an output current of the fuel cell.

The fuel supply control method may further include, before the estimating of the discharge amount of the gas, estimating a change in the amount of the gas in the interior of the recirculation line, based on a change in the pressure of the recirculation line.

The estimating of the discharge amount of the gas may include estimating the discharge amount of the gas per unit time in a state in which the discharge valve is opened. The fuel supply control method may further include, before the controlling of the opening/closing of the discharge valve, calculating a purge amount per unit time of the gas discharged through the discharge valve by subtracting the discharge offset calculated by the offset calculator from the discharge amount of the gas per unit time, which is estimated by the discharge amount estimator.

The calculating of the purge amount per unit time may include calculating the gas purge amount by integrating the calculated purge amount per unit time by a period of time for which the discharge valve is opened. The controlling of the opening/closing of the discharge valve may include controlling closing of the discharge valve, based on the calculated gas purge amount.

The fuel supply control method may further include, before the controlling of the opening/closing of the discharge valve, estimating the concentration of the fuel gas of the recirculation line, based on the supply amount of the fuel gas, the consumption amount of the fuel gas, and the discharge amount of the gas in the interior of the recirculation line. The controlling of the opening/closing of the discharge valve may include controlling opening/closing of the discharge valve, based on the estimated concentration of the fuel gas.

The system and method for fuel supply control for a fuel cell according to the present disclosure are advantageous in that the amount of gas in a recirculation line, which is discharged through a discharge valve, can be accurately estimated.

In addition, deterioration of a stack membrane due to a lack of the concentration of hydrogen can be prevented by preventing a hydrogen concentration lack or deficiency phenomenon due to a lack of or a deficient amount of discharged gas. A decrease in fuel ratio due to excessive discharge of hydrogen, and a dissatisfaction against rules regarding the concentration of exhaust hydrogen, can be prevented by preventing excessive hydrogen discharge.

BRIEF DESCRIPTION OF THE DRAWINGS

The above and other aspects, features, and advantages of the present disclosure should be apparent from the following detailed description taken in conjunction with the accompanying drawings, in which.

DETAILED DESCRIPTION

Figure 1:
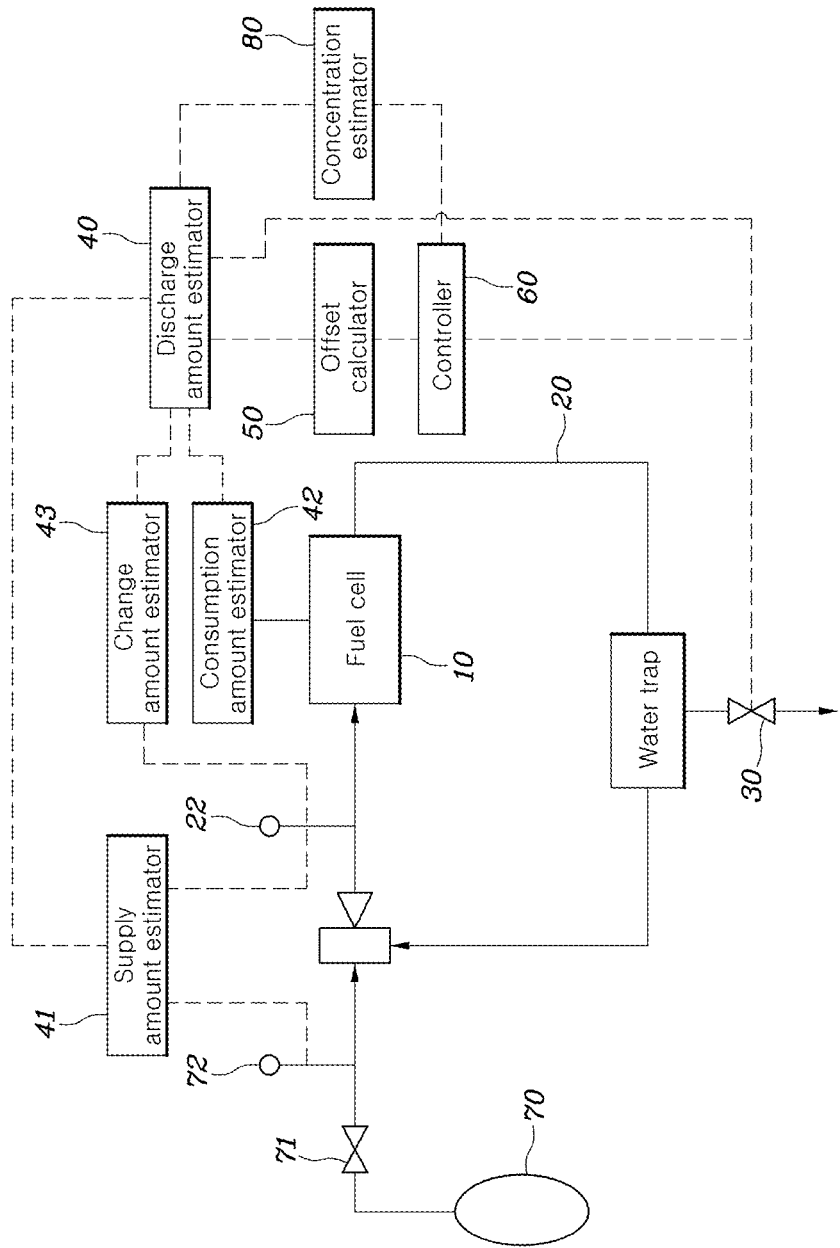
FIG. 1 is a diagram of a fuel supply control system for a fuel cell according to an embodiment of the present disclosure.

A specific structural or functional description of embodiments of the present disclosure described in the specification or application is given merely for the purpose of describing an embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure. Therefore, particular embodiments are illustrated in the drawings and described in the specification or application. However, it should be understood that embodiments according to the concept of the present disclosure are not limited to the particular disclosed embodiments. The present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element, without departing from the scope of protection of the present disclosure.

In the case where an element is referred to as being "connected" or "accessed" to other elements, it should be understood that the element may be directly connected or accessed to the other elements, but also that another element may exist between them. Contrarily, in the case where a component is referred to as being "directly connected" or "directly accessed" to any other component, it should be understood that there is no component therebetween. Other similar expressions of describing a relationship between structural elements, i.e. "between" and "merely between" or "neighboring" and "directly neighboring", should be interpreted similarly to the above description.

The terms used in the present disclosure are merely used to describe specific embodiments and are not intended to limit the present disclosure. A singular expression may include a plural expression unless they are definitely different in a context. As used herein, the expressions "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person having ordinary skill in the art to which the present disclosure pertains. Such terms as those defined in a generally used dictionary may be interpreted to have the meanings consistent with the contextual meanings in the relevant field of art. Such terms are not to be interpreted to have ideal or excessively formal meanings unless clearly defined in the present disclosure.

Hereinafter, in order to describe the present disclosure in detail, embodiments of the present disclosure are described with reference to the accompanying drawings. The same reference numerals suggested in the drawings denote the same members.

FIG. 1 is a diagram of a fuel supply control system for a fuel cell 10 according to an embodiment of the present disclosure.

Referring to FIG. 1, a fuel supply control system for a fuel cell 10 according to an embodiment of the present disclosure includes: a fuel cell 10 configured to receive a fuel gas and an oxidation gas and generate electric power; a recirculation line 20 configured to circulate gas containing the fuel gas in the interior thereof and connected to a fuel electrode of the fuel cell 10; and a discharge valve 30 provided in the recirculation line 20 and configured to allow the gas in the interior of the recirculation line 20 to be discharged to the outside when open. The fuel supply control system also includes a discharge amount estimator 40 configured to estimate a supply amount of the fuel gas supplied to the recirculation line 20, a consumption amount of the fuel gas consumed in the fuel cell 10, and a discharge amount of the gas discharged from the recirculation line 20, based on a change in the amount of the gas in the interior of the recirculation line 20. The fuel supply control system also includes an offset calculator 50 configured to calculate the discharge amount of the gas, which is estimated by the discharge amount estimator 40 in a state, in which the discharge valve 30 is closed, as a discharge offset. The fuel supply control system also includes a controller 60 configured to control opening/closing of the discharge valve 30, based on the discharge amount of the gas, which is estimated by the discharge amount estimator 40, and the discharge offset calculated by the offset calculator 50.

The offset calculator 50, the discharge amount estimator 40, the controller 60, and the concentration estimator 80 according to an embodiment of the present disclosure may be implemented by an algorithm, a nonvolatile memory, and a processor. The algorithm may be configured to control operations of various elements of the vehicle. The nonvolatile memory (not illustrated) may be configured to store data on a software instruction for reproducing the algorithm and the processor (not illustrated) may be configured to perform an operation, which is described below, by using the data stored in the memory. Here, the memory and the processor may be implemented by individual chips. Alternatively, the memory and the processor may be implemented by an integrated single chip. The processor may take the form of one or more processors.

The fuel cell 10 receives a fuel gas in the anode thereof and receives an oxidation gas in the cathode thereof to generate electric power. The fuel cell 10 may be a fuel cell stack constituted by a plurality of stacked cells. In an embodiment, the fuel gas is hydrogen, the oxidation gas is oxygen, and the fuel cell 10 may receive air containing oxygen.

The fuel electrode (anode) of the fuel cell 10 may be connected to the recirculation line 20 and may receive gas containing hydrogen that flows through the recirculation line 20. In particular, the gas containing the hydrogen discharged from an outlet of the fuel electrode of the fuel cell 10 recirculates through the recirculation line 20 and may be supplied to an inlet of the fuel electrode of the fuel cell 10 again.

Further, the discharge valve 30 is provided in the recirculation line 20 to discharge the gas containing the hydrogen that circulates in the interior of the recirculation line 20 to the outside. In an embodiment, the discharge valve 30 may be a purge valve that purges the gas in the recirculation line 20. In another embodiment, the discharge valve 30 may be a drain valve that discharges condensate introduced into the recirculation line 20.

In particular, the discharge valve 30 may be located on a side, which is close to an outlet of the fuel cell 10 with respect to a direction, in which the gas in the interior of the recirculation line 20 circulates. The gas discharged from the fuel cell 10 and containing a relatively large amount of impurities may be discharged to the outside.

The discharge amount estimator 40 may estimate the discharge amount of the gas discharged from the recirculation line 20 to the outside. The discharge amount estimator 40 may estimate a discharge amount of the gas, based on a supply amount of the fuel gas supplied to the recirculation line 20, a consumption amount of the fuel gas consumed in the fuel cell 10, and a change in the amount of the gas in the interior of the recirculation line 20.

The discharge amount of the gas, which is estimated by the discharge amount estimator 40, may include a discharge amount of the gas discharged from the recirculation line 20 to the outside through the discharge valve 30 and may include a discharge amount of the gas by a cross-over between a fuel electrode and an air electrode through a membrane electrode assembly (MEA) in the interior of the fuel cell 10.

The offset calculator 50 may calculate the discharge amount of the gas, which is estimated by the discharge amount estimator 40 in a state in which the discharge valve 30 is closed, as a discharge offset. Here, the discharge offset may be generated due to exchange of the gas between the fuel electrode and the air electrode through the membrane electrode assembly in the interior of the fuel cell 10.

In other words, in order to estimate the discharge amount of the gas discharged through the discharge valve 30 by opening the discharge valve 30 more precisely, the discharge amount of the gas estimated by the discharge amount estimator 40 in a state in which the discharge valve 30 is closed, may be calculated as the discharge offset.

The controller 60 may control opening/closing of the discharge valve 30, based on the discharge amount of the gas, which is estimated by the discharge amount estimator 40, and the discharge offset calculated by the offset calculator 50. In particular, the controller 60 may control opening/closing of the discharge valve 30 by estimating the discharge amount of the gas due to the opening of the discharge valve 30.

Accordingly, deterioration of a stack membrane of a fuel cell 10 due to a lack of or a deficiency in the concentration of hydrogen can be prevented by preventing a hydrogen concentration lack or deficiency phenomenon due to a lack of or a deficient discharge amount of the gas. A decrease in fuel ratio due to excessive discharge of hydrogen, and a dissatisfaction against rules regarding the concentration of exhausted hydrogen, can be prevented by preventing excessive hydrogen discharge.

The fuel supply control system for a fuel cell may further include: a fuel tank 70, in which the fuel gas is stored in the interior thereof; and a supply amount estimator 41 configured to estimate the supply amount of the fuel gas, based on a pressure of a connection hole connected from the fuel tank 70 to the recirculation line 20 and a pressure of the recirculation line 20.

The fuel tank 70, in which hydrogen is stored in the interior thereof at a high pressure, may be connected to the recirculation line 20 on a side, which is close to an inlet of the fuel cell 10. In particular, the fuel tank 70 may be connected to the recirculation line 20 via a pressure valve 71 and may be connected to the recirculation line 20 through an ejector for generating fluid flows in the interior of the recirculation line 20. The pressure valve 71 may include a pressure check valve and a pressure control valve and may be an integrated valve.

The first pressure sensor 72 may be disposed between the pressure valve 71 and the ejector to sense the pressure of the connection hole connected from the fuel tank 70 to the recirculation line 20.

The second pressure sensor 22 may be disposed in the recirculation line 20 and may sense the pressure of the interior of the recirculation line 20.

The supply amount estimator 41 may estimate the supply amount of hydrogen based on: the pressure of the connection hole, which is sensed by the first pressure sensor 72; a pressure difference of the recirculation line 20, which is sensed by the second pressure sensor 22; and an opening period of time of the pressure valve 71.

Further, the fuel supply control system for a fuel cell may further include a consumption amount estimator 42 configured to estimate the consumption amount of the fuel gas based on the generated electric power or an output current of the fuel cell 10.

The consumption amount estimator 42 may estimate the consumption amount of hydrogen consumed in the generation of electric power by the fuel cell 10 by integrating the generated electric power and the output current of the fuel cell 10 by time.

Additionally, the consumption amount estimator 42 may precisely estimate the consumption amount of hydrogen further in consideration of the operation temperature (estimated by sensing the temperature of the coolant) of the fuel cell 10.

In addition, the fuel supply control system for a fuel cell may further include a change amount estimator 43 configured to estimate a change in the amount of gas in the interior of the recirculation line 20 based on the change in the pressure of the recirculation line 20.

In the above embodiment, the second pressure sensor 22 that senses the internal pressure of the recirculation line 20 is included. The change amount estimator 43 may estimate the change in the amount of the gas in the interior of the recirculation line 20, based on the change in the pressure of the recirculation line 20, which is sensed by the second pressure sensor 22.

Accordingly, because the volume of the recirculation line 20 is a fixed value, the change in the amount of the gas in the interior of the recirculation line 20 may be estimated by using an ideal gas state equation.

$$P \cdot V = n \cdot R \cdot T$$

Here, P may be the pressure of the recirculation line 20, V may be the internal volume of the recirculation line 20, n may be the molecular number of the gas, R may be the gas constant, and T may be the temperature of the recirculation line 20.

Accordingly, when it is assumed that the temperature is constant, the change in the amount of the gas in the interior of the recirculation line 20 may be estimated as in the following equation.

$$\Delta n = \frac{\Delta P \cdot V}{R \cdot T}$$

Additionally, the change amount estimator 43 may estimate the amount of the gas in the interior of the recirculation line 20 more precisely by sensing the temperature of the interior of the recirculation line 20 and reflecting the sensed temperature.

Accordingly, as in the following equation, the discharge amount estimator 40 may estimate the discharge amount of the gas by subtracting the consumption amount and the change in the amount of the gas of the hydrogen from the supply amount of the hydrogen.

Discharge amount=Hydrogen supply amount−Hydrogen consumption amount−Change in the amount of gas In addition, the discharge amount estimator 40 may estimate the discharge amount of the gas per unit time as in the following equation.

$$q_d = q_s - q_u - q_t$$

Here, $q_d$ is the discharge amount of the gas per unit time, $q_s$ is the supply amount of hydrogen per unit time, $q_u$ is the consumption amount of hydrogen per unit time, and $q_t$ is the change in the amount of gas per unit time.

The offset calculator 50 may calculate the discharge amount of the gas discharged from the recirculation line 20 to the outside per unit time in a state, in which the discharge valve 30 is closed, as a discharge offset $q_e$.

The offset calculator 50 may identify whether the discharge valve 30 is closed and may calculate the discharge amount estimated by the discharge amount estimator 40 while the discharge valve 30 is closed as the discharge offset $q_e$.

The offset calculator 50 may calculate the discharge offset $q_e$ by initializing the discharge amount of the gas when it is identified that the discharge valve 30 is closed, integrating the discharge amount estimated by the discharge amount estimator 40 while the discharge valve 30 is closed by time, and dividing the integrated discharge amount by a duration.

Further, the discharge amount estimator 40 may calculate the purge rate per unit time $q_c$ of the gas discharged through the discharge valve 30 by estimating the discharge amount $q_d$ of the gas per unit time while the discharge valve 30 is opened, and by subtracting the discharge offset $q_e$ calculated by the offset calculator 50 from the calculated discharge amount $q_d$ of the gas per unit time.

The discharge amount estimator 40 may identify whether the discharge valve 30 is opened and may estimate the discharge amount $q_d$ of the gas per unit time while the discharge valve 30 is opened. Further, the discharge amount estimator 40 may calculate the purge rate per unit time $q_c$ of the gas discharged through the discharge valve 30 by subtracting the discharge offset $q_e$ from the discharge amount $q_d$ of the gas per unit time while the discharge valve 30 is opened.

Accordingly, the discharge amount estimator 40 may calculate the purge rate per unit time $q_c$ of the gas purged to the outside through the discharge valve 30 by correcting for the discharge offset $q_e$ of the gas discharged due to a crossover.

The discharge amount estimator 40 may calculate the gas purge amount $Q_C$ by integrating the calculated purge rate per unit time $q_c$ by the period of time, for which the discharge valve 30 is opened. The controller 60 may control closing of the discharge valve 30, based on the calculated gas purge amount $Q_C$.

In an embodiment, the controller 60 may determine whether the calculated gas purge amount $Q_C$ is equal to or exceeds a preset purge amount and may perform a control to close the discharge valve 30 if the calculated gas purge amount $Q_C$ is equal to or exceeds the preset purge amount.

In another embodiment, the fuel supply control system for a fuel cell may further include a concentration estimator 80 configured to estimate the concentration of the fuel gas of the recirculation line 20, based on the supply amount of the fuel gas, the consumption amount of the fuel gas, and the discharge amount of the gas in the interior of the recirculation line 20. The controller 60 may control opening/closing of the discharge valve 30, based on the concentration of the fuel gas estimated by the concentration estimator 80.

The concentration estimator 80 may estimate the concentration of the fuel gas of the recirculation line 20, based on the supply amount of the fuel gas, the consumption amount of the fuel gas, and the discharge amount of the gas in the interior of the recirculation line 20.

The concentration estimator 80 may predict the initial amount of nitrogen and the initial amount of vapor in the recirculation line 20 and may calculate the amount of nitrogen that is crossed over, the amount of vapor that is crossed over, the amount of purged nitrogen, and the amount of purged vapor. Further, the current amount of nitrogen of the recirculation line 20 may be calculated based on the predicted initial amount of the nitrogen, the amount of the nitrogen that is crossed over, and the amount of the purged nitrogen The current amount of vapor of the recirculation line 20 may be calculated based on the predicted initial amount of the vapor, the amount of the vapor that is crossed over, and the amount of the purged vapor.

In other words, the current amount of nitrogen and the current amount of vapor may be calculated by integrating the diffusion rate of the initial amount and the purge rate per unit time by time.

The current amount of the hydrogen may be calculated by subtracting the current amount of the nitrogen and the current amount of the vapor from the total amount of gas in the recirculation line 20.

Accordingly, the concentration of the hydrogen of the recirculation line 20 may be monitored by calculating the total amount of the gas, the current amount of the nitrogen, the current amount of the vapor, and the current amount of the hydrogen in the recirculation line 20 with an assumption that the concentration of the gas in the recirculation line is uniform. Accordingly, the concentration of the hydrogen may be continuously monitored by calculating the concentration of the hydrogen, which cannot be easily estimated due to a reaction with oxygen and the like, through the amount of the nitrogen and the amount of the vapor.

The total amount of the gas $\eta_{An}$ in the recirculation line 20 may be estimated by using the gas pressure P, the volume V, and the temperature T of the recirculation line 20 from the ideal gas state equation as in the following equation.

$$\eta_{An} = \frac{P_{An}V_{An}}{RT}[\text{mol}]$$

Here, R is the gas constant (8.314 J/molK).

The gas diffusion rate may be inversely proportional to the thickness of the electrolyte membrane of the fuel cell 10 and may be proportional to the difference between the partial pressures of the gas of the anode and the cathode. The amount of the gas that is crossed over may be calculated by applying the Fick's Law (a diffusion law).

$$\frac{\dot{m}}{A} = -D\frac{\partial c}{\partial x} = -D\frac{M}{RT}\frac{\partial P}{\partial x}$$

Here, $\dot{m}$ is the mass diffusion rate of the gas (g/s), A is the diffusion area, D is the diffusion coefficient of the gas, x is the diffusion distance, c is the concentration of the gas, R is the general gas constant (8.314 J/mol), P is the pressure of the gas, T is the temperature of the gas [° K], and M is the molar mass of the gas (g/mol). This may be arranged in the following.

$$\dot{m} = -D\frac{M}{RT}\frac{\partial P}{\partial x}A = \dot{n} \cdot M$$

$$\dot{n} = -D\frac{1}{RT}\frac{\partial P}{\partial x}A$$

Here, $\dot{n}$ is the diffusion rate of the gas (mol/s).

In other words, the amount of the gas that is crossed over between the electrolyte membranes of the fuel cell 10 may be calculated in the following equation.

$$n_{N2\_xo} = \frac{D_{N2}}{RT}\frac{P_{Ca,N2} - P_{An,N2}}{\delta}A$$

Here, $n_{N2\_xo}$ is the diffusion rate of nitrogen, P is the pressure of the gas [kPa], R is the gas constant and is 8.314 [J/mol/K], T is the temperature of the gas [° K], D is the diffusion coefficient, A is the area of the electrolyte membrane, δ is the thickness of the electrolyte membrane, $P_{Ca,N2}$ is the partial pressure of nitrogen of the cathode of the fuel cell 10, and $P_{An,N2}$ is the partial pressure of nitrogen of the anode of the fuel cell 10.

$$n_{V\_xo} = \frac{D_V}{RT}\frac{P_{Ca,V} - P_{An,V}}{\delta}A$$

Here, $n_{V\_xo}$ is the diffusion rate of vapor, P is the pressure of the gas [kPa], R is the gas constant and is 8.314 [J/mol/K], T is the temperature of the gas [° K], D is the diffusion coefficient, A is the area of the electrolyte membrane, δ is the thickness of the electrolyte membrane, $P_{Ca,V}$ is the partial pressure of vapor of the cathode of the fuel cell 10, and $P_{An,V}$ is the partial pressure of vapor of the anode of the fuel cell 10.

To the contrary, hydrogen may be crossed over from the anode to the cathode of the fuel cell 10.

$$n_{H2\_xo} = \frac{D_{H2}}{RT} \frac{P_{Ca,H2} - P_{An,H2}}{\delta} A$$

Here, $n_{H2\_xo}$ is the diffusion rate of hydrogen, P is the pressure of the gas [kPa], R is the gas constant (8.314 J/mol/K), T is the temperature of the gas [° K], D is the diffusion coefficient, A is the area of the electrolyte membrane, $\delta$ is the thickness of the electrolyte membrane, $P_{Ca,H2}$ is the partial pressure of vapor of the anode of the fuel cell 10, and $P_{An,H2}$ is the partial pressure of vapor of the cathode of the fuel cell 10.

Further, the gas diffusion rate is proportional to the gas diffusion coefficient. The gas diffusion coefficient may vary according to the water content and the temperature of the electrolyte membrane located between the anode and the cathode of the fuel cell 10.

The gas diffusion coefficient D may be approximated as a fixed constant value. However, the gas diffusion coefficient D may be a value that varies according to the deterioration degree, the temperature, and the like of the fuel cell 10 to further increase precision. The gas diffusion coefficient D may be calculated by using a value that varies according to the water content and the temperature of the electrolyte membrane located between the anode and the cathode of the fuel cell 10. Additionally, the gas diffusion coefficient D may be calculated to vary as the electrolyte membrane of the fuel cell 10 deteriorates.

In another embodiment, the amount of the gas that is crossed over between the electrolyte membranes of the fuel cell 10 may be estimated by using the discharge offset.

The purge rate $n_{purge}$ of the gas may be proportional to the difference between the pressure $P_{An}$ of the gas of the anode and the pressure $P_{out}$ of the gas on the outside. The pressure $P_{out}$ of the gas on the outside may be the pressure of the gas of the cathode. The detailed equation may be as follows.

$$n_{purge} = C(P_{An} - P_{out})$$

Here, C is a purge gain value, and may be determined according to the purge cycle, the opening degree of the purge valve 22 and the opening period of time of the purge valve 22 during the purge.

The purge rates for the gases may be calculated as in the following equation (the nitrogen purge rate $n_{n2\_purge}$, the vapor purge rate $n_{V\_purge}$, and the hydrogen purge rate $n_{Hn2\_purge}$).

$$n_{N2purge} = \dot{n}_{purge} \frac{n_{N2}}{n_{An}}$$

$$n_{V2purge} = \dot{n}_{purge} \frac{n_V}{n_{An}}$$

$$n_{H2purge} = \dot{n}_{purge} \frac{n_{H2}}{n_{An}}$$

In another embodiment, the gas purge rate or the gas purge amount may be estimated by using the discharge amount of the gas estimated by the discharge amount estimator 40 and the discharge offset calculated by the offset calculator 50.

The controller 60 may control the discharge valve 30 to be closed if the concentration of the fuel gas estimated by the concentration estimator 80 is equal to or exceeds a preset concentration The concentration of the fuel gas may be estimated by the concentration estimator 80 based on the discharge amount of the gas, which is estimated by the discharge amount estimator 40, and the discharge offset calculated by the offset calculator 50.

Figure 2:
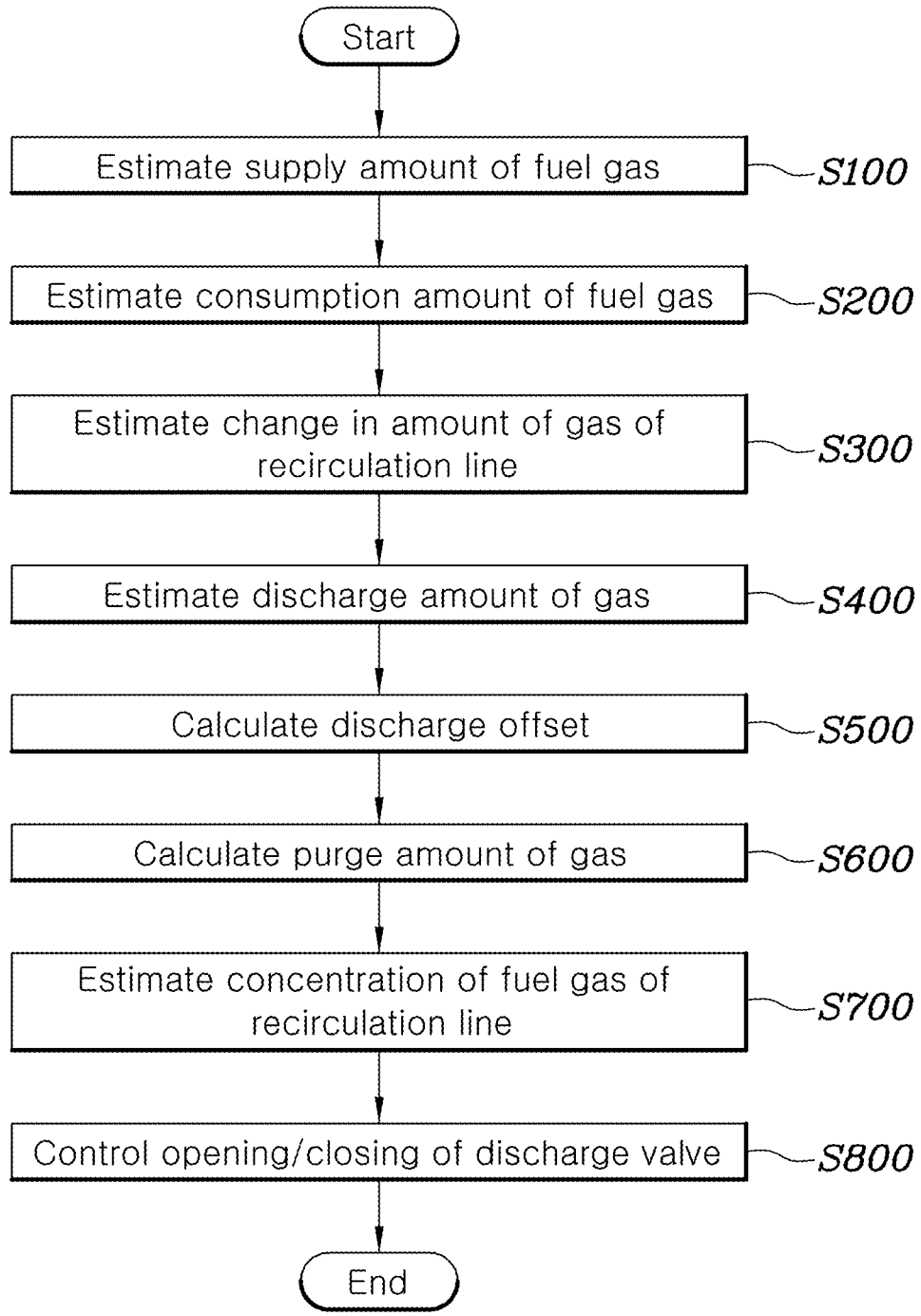
FIG. 2 is a flowchart of a fuel supply control method for a fuel cell according to an embodiment of the present disclosure.

FIG. 2 is a flowchart of a fuel supply control method for a fuel cell 10 according to an embodiment of the present disclosure.

Referring further to FIG. 2, a fuel supply control method for a fuel cell 10 according to an embodiment of the present disclosure includes: an operation (S100) of estimating a supply amount of the fuel gas supplied to the recirculation line 20, an operation (S200) of estimating a consumption amount of the fuel gas consumed in the fuel cell 10; an operation (S400) of estimating a discharge amount of the gas discharged from the recirculation line 20, based on a change in the amount of the gas in the interior of the recirculation line 20; an operation (S500) of calculating the discharge amount of the gas estimated in a state, in which the discharge valve 30 is closed, as a discharge offset; and an operation (S800) of controlling opening/closing of the discharge valve 30, based on the estimated discharge amount of the gas and the calculated discharge offset.

The fuel supply control method may further include an operation (S100) of, before the operation (S400) of estimating the discharge amount of the gas, estimating the supply amount of the fuel gas, based on a pressure of an inlet connected from the fuel tank 70 to the recirculation line 20 and a pressure of the recirculation line 20.

The fuel supply control method may further include an operation (S200) of, before the operation (S400) of estimating the discharge amount of the gas, estimating the consumption amount of the fuel gas, based on generated electric power or an output current of the fuel cell 10.

The fuel supply control method may further include an operation (S300) of, before the operation (S400) of estimating the discharge amount of the gas, estimating a change in the amount of the gas in the interior of the recirculation line 20, based on a change in the pressure of the recirculation line 20.

The operation (S400) of estimating the discharge amount of the gas may include an operation (S600) of estimating the discharge amount of the gas per unit time in a state, in which the discharge valve 30 is opened. The fuel supply control method may further include an operation of, before the operation (S800) of controlling the opening/closing of the discharge valve 30, calculating a purge amount per unit time of the gas discharged through the discharge valve 30 by subtracting the discharge offset calculated by the offset calculator 50 from the discharge amount of the gas per unit time, which is estimated by the discharge amount estimator 40.

The operation (S600) of calculating the purge amount per unit time may include an operation of calculating the gas purge amount by integrating the calculated purge amount per unit time by a period of time, for which the discharge valve is opened. The operation (S800) of controlling the opening/closing of the discharge valve 30 may include an operation of controlling closing of the discharge valve 30, based on the calculated gas purge amount.

The fuel supply control method may further include an operation (S700) of, before the operation (S800) of controlling the opening/closing of the discharge valve 30, estimating the concentration of the fuel gas of the recirculation line 20, based on the supply amount of the fuel gas, the consumption amount of the fuel gas, and the discharge amount of the gas in the interior of the recirculation line 20. The operation (S800) of controlling the opening/closing of the discharge valve 30 may include an operation of controlling opening/closing of the discharge valve 30, based on the estimated concentration of the fuel gas.

Although the present disclosure has been described and illustrated in conjunction with particular embodiments thereof, it should be apparent to those having ordinary skill in the art that various improvements and modifications may be made to the present disclosure without departing from the technical idea of the present disclosure defined by the claims.

What is claimed is:

1. A fuel supply control system for a fuel cell, comprising:
    a fuel cell configured to receive a fuel gas and an oxidation gas and generate electric power;
    a recirculation line configured to circulate gas containing the fuel gas in the interior thereof and connected to a fuel electrode of the fuel cell;
    a discharge valve provided in the recirculation line and configured to allow the gas in the interior of the recirculation line to be discharged to the outside when being opened;
    a discharge amount estimator configured to estimate a discharge amount of the gas discharged from the recirculation line, based on a supply amount of the fuel gas supplied to the recirculation line, a consumption amount of the fuel gas consumed in the fuel cell, and a change in the amount of the gas in the interior of the recirculation line;
    an offset calculator configured to calculate the discharge amount of the gas, which is estimated by the discharge amount estimator in a state in which the discharge valve is closed, as a discharge offset; and
    a controller configured to control opening/closing of the discharge valve, based on the discharge amount of the gas, which is estimated by the discharge amount estimator, and the discharge offset calculated by the offset calculator.

2. The fuel supply control system of claim 1, further comprising:
    a fuel tank, in which the fuel gas is stored in the interior thereof; and
    a supply amount estimator configured to estimate the supply amount of the fuel gas, based on a pressure of a connection hole connected from the fuel tank to the recirculation line and a pressure of the recirculation line.

3. The fuel supply control system of claim 1, further comprising:
    a consumption amount estimator configured to estimate the consumption amount of the fuel gas, based on generated electric power or an output current of the fuel cell.

4. The fuel supply control system of claim 1, further comprising:
    a change amount estimator configured to estimate the change in the amount of the gas in the interior of the recirculation line, based on a change in the pressure of the recirculation line.

5. The fuel supply control system of claim 1, wherein the offset calculator calculates, as the discharge offset, the discharge amount of the gas discharged from the recirculation line to the outside per unit time in the state in which the discharge valve is closed.

6. The fuel supply control system of claim 1, wherein the discharge amount estimator calculates a purge amount per unit time of the gas discharged through the discharge valve by estimating the discharge amount of the gas per unit time in a state in which the discharge valve is opened, and by subtracting the discharge offset calculated by the offset calculator from the estimated discharge amount of the gas per unit time.

7. The fuel supply control system of claim 6, wherein the discharge amount estimator calculates the gas purge amount by integrating the calculated purge amount per unit time by a period of time, for which the discharge valve is opened, and
    wherein the controller controls closing of the discharge valve, based on the calculated gas purge amount.

8. The fuel supply control system of claim 1, further comprising:
    a concentration estimator configured to estimate the concentration of the fuel gas of the recirculation line, based on the supply amount of the fuel gas, the consumption amount of the fuel gas, and the discharge amount of the gas in the interior of the recirculation line; and
    wherein the controller controls opening/closing of the discharge valve, based on the concentration of the fuel gas, which is estimated by the concentration estimator.

9. A fuel supply control method for a fuel cell, comprising:
    estimating a supply amount of a fuel gas supplied to a recirculation line, a consumption amount of the fuel gas consumed in a fuel cell, and a discharge amount of a gas discharged from the recirculation line, based on a change in the amount of the gas in the interior of the recirculation line;
    calculating the discharge amount of the gas estimated in a state in which a discharge valve is closed, as a discharge offset; and
    controlling opening/closing of the discharge valve, based on the estimated discharge amount of the gas and the calculated discharge offset.

10. The fuel supply control method of claim 9, further comprising:
    before the estimating of the discharge amount of the gas, estimating the supply amount of the fuel gas, based on a pressure of an inlet connected from the fuel tank to the recirculation line and a pressure of the recirculation line.

11. The fuel supply control method of claim 9, further comprising:
    before the estimating of the discharge amount of the gas, estimating the consumption amount of the fuel gas, based on generated electric power or an output current of the fuel cell.

12. The fuel supply control method of claim 9, further comprising:
    before the estimating of the discharge amount of the gas, estimating the change in the amount of the gas in the interior of the recirculation line, based on a change in a pressure of the recirculation line.

13. The fuel supply control method of claim 9, wherein the estimating of the discharge amount of the gas comprises:
    estimating the discharge amount of the gas per unit time in a state in which the discharge valve is opened, and
    wherein the fuel supply control method further comprises:
    before the controlling of the opening/closing of the discharge valve, calculating a purge amount per unit time of the gas discharged through the discharge valve by subtracting the discharge offset calculated by the offset calculator from the discharge amount of the gas per unit time, which is estimated by the discharge amount estimator.

14. The fuel supply control method of claim 13, wherein the calculating of the purge amount per unit time comprises:

calculating the gas purge amount by integrating the calculated purge amount per unit time by a period of time, for which the discharge valve is opened, and wherein the controlling of the opening/closing of the discharge valve comprises:

controlling closing of the discharge valve, based on the calculated gas purge amount.

15. The fuel supply control method of claim 9, further comprising:

before the controlling of the opening/closing of the discharge valve, estimating the concentration of the fuel gas of the recirculation line, based on the supply amount of the fuel gas, the consumption amount of the fuel gas, and the discharge amount of the gas in the interior of the recirculation line, and wherein the controlling of the opening/closing of the discharge valve comprises:

controlling opening/closing of the discharge valve, based on the estimated concentration of the fuel gas.

* * * * *